United States Patent
Robinson

[15] 3,665,946
[45] May 30, 1972

[54] TANK TRUCK SAFETY VALVE
[72] Inventor: Bernie E. Robinson, Oak Creek, Wis.
[73] Assignee: Milwaukee Valve Company, Inc., Milwaukee, Wis.
[22] Filed: Aug. 10, 1970
[21] Appl. No.: 62,267

[52] U.S. Cl..................................137/68, 251/144, 251/331
[51] Int. Cl.........................................................F16k 27/03
[58] Field of Search......................251/54, 55, 144, 331, 339; 137/68, 451

[56] References Cited

UNITED STATES PATENTS

| | | | |
|---|---|---|---|
| 907,458 | 12/1908 | Cavanaugh | 251/331 X |
| 994,438 | 6/1911 | Baltes | 251/144 |
| 1,924,356 | 8/1933 | Glab | 137/68 |

*Primary Examiner*—M. Cary Nelson
*Assistant Examiner*—Richard Gerard
*Attorney*—John W. Michael, Gerrit D. Foster, Bayard H. Michael, Paul R. Puerner, Joseph A. Gemignani, Andrew O. Riteris and Spencer B. Michael

[57] ABSTRACT

The upper portion of the valve body encloses the spring acting on the diaphragm valve to normally seat the valve. The lower portion of the valve body carries the valve actuator which lifts the valve against the spring load. If the outlet portion is struck hard enough, the groove in the body just below the valve seat will break, which allows the outlet and actuator to fall away whereupon the spring closes the valve. This prevents accidental loss of the contents of the tank truck. The spring chamber is vented. The parts exposed to the contents are readily cleaned in place.

4 Claims, 4 Drawing Figures

Patented May 30, 1972
3,665,946
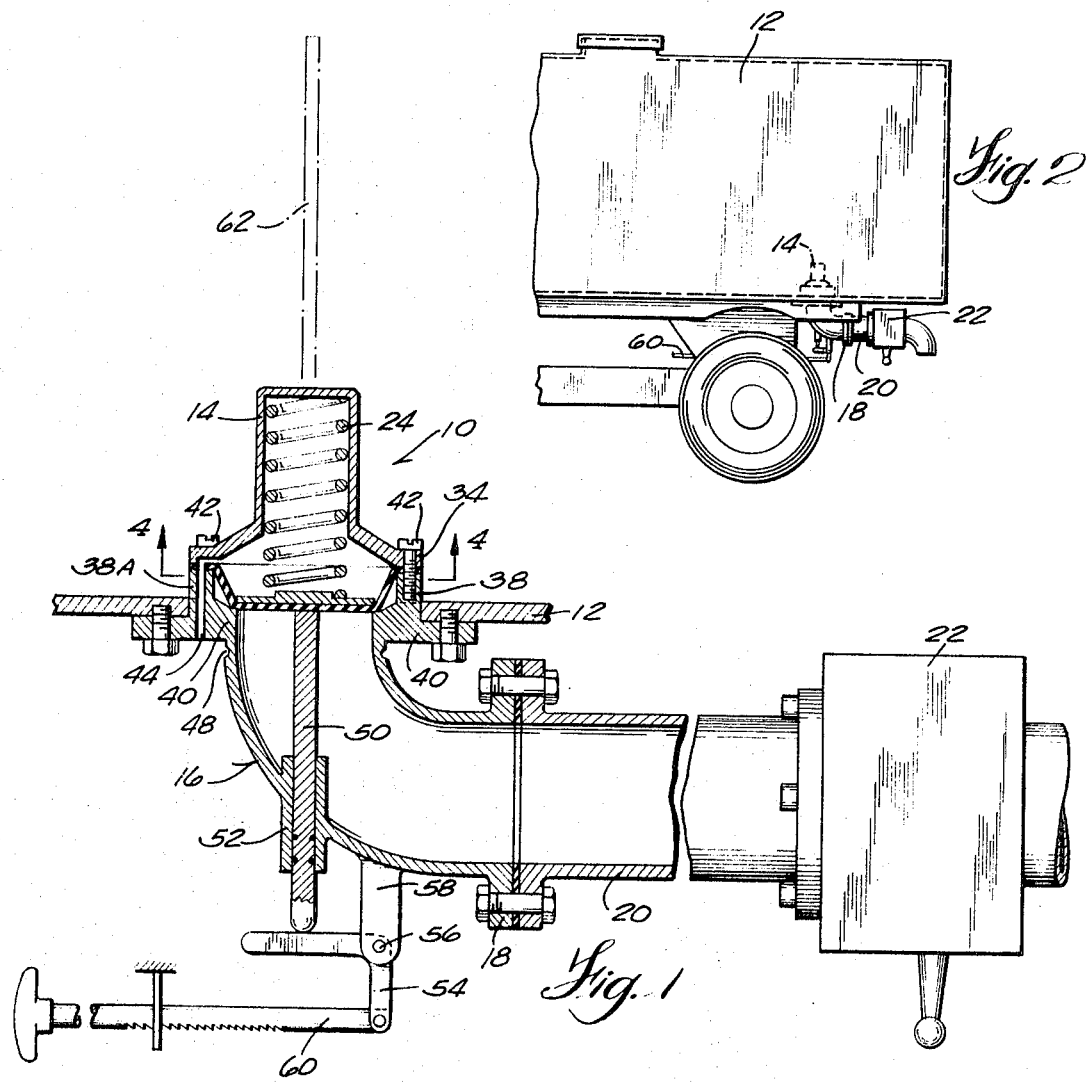
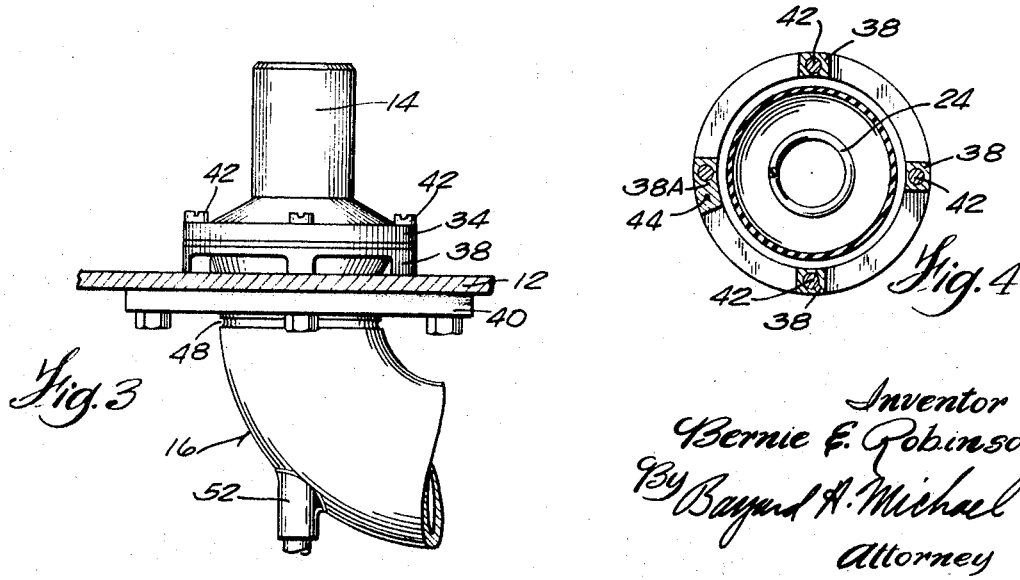
Inventor
Bernie E. Robinson
By Bayard H. Michael
Attorney

TANK TRUCK SAFETY VALVE

BACKGROUND OF INVENTION

Safety check valves used in the discharge conduit of tank trucks have been characterized by exposed parts which "gum up" and malfunction and/or are most difficult to clean without removal. When the cargo is to be changed, the usual practice is to have the tank cleaned at a depot specializing in this service. Since the prior art valves are so hard to clean when in the truck body, the usual practice calls for replacement with a clean valve. Many prior art valves have stem guides, etc. which may be so corroded that the valves cannot close when the "breakaway" occurs. New safety codes now being proposed in some states can not be met by the prior art for this reason.

SUMMARY OF INVENTION

The valve set forth in the abstract has the advantage of being easy to clean without necessitating its removal from the tank because the spring enclosed in the upper portion of the valve is isolated from the tank contents and there are no cavities not in the flow path.

Another advantage resides in positioning the actuating rod in the discharge portion with no stem guides carried by the portion remaining on the truck should the outlet portion be struck hard enough to separate at the breakaway groove. Thus, the entire actuating mechanism separates from the diaphragm and there can be no resistance to valve closure.

DESCRIPTION OF DRAWINGS

FIG. 1 is a vertical cross section of the valve.

FIG. 2 shows the position of the valve in the discharge conduit.

FIG. 3 is an elevation view of the valve positioned in the tank.

FIG. 4 is a cross-sectional view taken along line 4—4 of FIG. 1.

DESCRIPTION OF PREFERRED EMBODIMENT

The valve 10 is mounted in the bottom of the truck tank 12 with the upper portion 14 inside the tank and the lower outlet portion 16 depending from the tank and extending rearwardly. A standard flange fitting 18 on the outlet accommodates a standard discharge conduit 20 including manually operated valve 22.

The upper valve portion 14 houses compressed coil spring 24 acting on diaphragm plate 26 on the top of diaphragm 28. The upper body includes a flange 34 which overlies annular diaphragm support ring 36 located above spacer posts 38 carried by base 40. Cap screws 42 secure the top to the bottom with the diaphragm rim sandwiched between. One post, 38A, is slightly larger and includes a vent hole 44 which aligns with corresponding holes or passages in the diaphragm and upper housing to vent the spring chamber. Valve seat 46 is slightly recessed in base 40 for easy flow and cleaning. The spring loaded diaphragm valve closes on the seat. The base includes a mounting flange permitting the unit to be bolted to the tank from outside.

The outlet elbow 16 is separated from the base by a groove 48 which creates a weakened zone which will break if the elbow or valve 22 is hit hard enough. This allows the outlet 16 and valve 22 to fall away, which allows the diaphragm valve to be closed by spring 24 since the valve actuator pin 50 is carried by the elbow in bushing or guide 52. O-ring seals prevent leakage along the pin. The pin is actuated by bell crank 54 pivoted at 56 on support 58 fixed on the elbow. The crank is actuated by any suitable means such as rod 60, which is toothed for retention in the valve open position. This permits the operator to keep the diaphragm valve open and control flow with valve 22. Even if the diaphragm valve is held open in transit, any damage causing the elbow to break away cannot cause much loss of the tank contents since the diaphragm valve promptly closes.

When the diaphragm valve is open, the tank contents flow into the elbow by flowing between posts 38 to the valve seat 46 and then to the outlet. There are virtually no "hidden" pockets preventing thorough cleaning of the valve while in the tank. In most instances it can be cleaned in place in the tank. Since upper guides for the actuating pin are not necessary, there is no way for the pin to jam and hold the valve open should the elbow be knocked off.

As noted, the spring chamber is vented through passage 44. Should the diaphragm leak and allow flow into the chamber, this could mean leakage out of the tank via the chamber and passage 44. With the modern diaphragm materials this is not likely but if of concern the vent passage 44 is not used and a vent — such as a tube 62 to the top of the tank may be used.

I claim:

1. A safety valve for tank trucks, comprising,
    a valve body including a mounting flange permitting the body to be mounted on he underside of a tank,
    said body including an upper portion and a discharge portion spaced apart to form an inlet therebetween,
    a valve seat on the discharge portion facing the upper portion of the body,
    a diaphragm valve between the body portions and movable to and from the seat and defining a chamber in cooperation with the upper body portion,
    a spring in the chamber acting on the diaphragm valve to close the diaphragm valve on the seat,
    a manually operated actuator pin supported and guided solely by the discharge portion and disengageably connected with the diaphragm valve to move it away from the seat or to allow the diaphragm valve to close under influence of the spring,
    said discharge portion being weakened between the seat and the actuator support and guide so the discharge portion will break at the weakened area should the discharge portion receive a hard blow and allow the diaphragm valve to close as the discharge portion including the actuator pin falls away.

2. A safety valve according to claim 1 in which the discharge portion includes an elbow,
    said actuator support and guide being formed in the elbow,
    said actuator pin being slidable in the guide and sealed relative thereto to prevent leakage along the pin,
    one end of the pin abutting the diaphragm and the other end being externally accessible.

3. A safety valve according to claim 2 including a vent from the chamber.

4. A safety valve according to claim 3 in which the body portions are spaced by posts and the vent passes through one of the posts to atmosphere on the discharge side of the mounting flange.

* * * * *